United States Patent

[11] 3,625,794

[72] Inventors Shoichi Arikawa;
Kouichi Hujiwara; Kyoichiro Ikari; Yukio Nishimatsu, all of Kurashiki, Japan
[21] Appl. No. 841,698
[22] Filed July 15, 1969
[45] Patented Dec. 7, 1971
[73] Assignee Kuraray Co., Ltd.
Kurashiki, Japan
[32] Priority July 17, 1968
[33] Japan
[31] 43/50335

[54] METHOD OF PREPARING LAMINATED FILMS WHILE REGULATING MOISTURE CONTENT
4 Claims, 1 Drawing Fig.
[52] U.S. Cl. .................................................. 156/244, 156/306, 156/322, 156/64
[51] Int. Cl. .................................................. B29c 19/00
[50] Field of Search .................................................. 156/244, 306, 322, 64

[56] References Cited
UNITED STATES PATENTS
3,470,055  9/1969  Wade ........................... 156/244

Primary Examiner—Carl D. Quarforth
Assistant Examiner—Stephen J. Lechert, Jr.
Attorney—Stepno and Neilan ABSTRACT: Laminated films are produced by conditioning a melt of a polyvinyl alcohol resin to a moisture content of 20 to 60 percent by weight and a temperature between 50° C. and 160° C., extruding said conditioned melt in the form of a thin film through a slit onto the surface of a roller, the roller surface temperature being adjusted to between room temperature and 100° C., passing the resulting film over at least one hot roller, and laminating said polyvinyl alcohol film with a protective film while the polyvinyl alcohol film has a moisture content of 5 to 40 percent by weight.

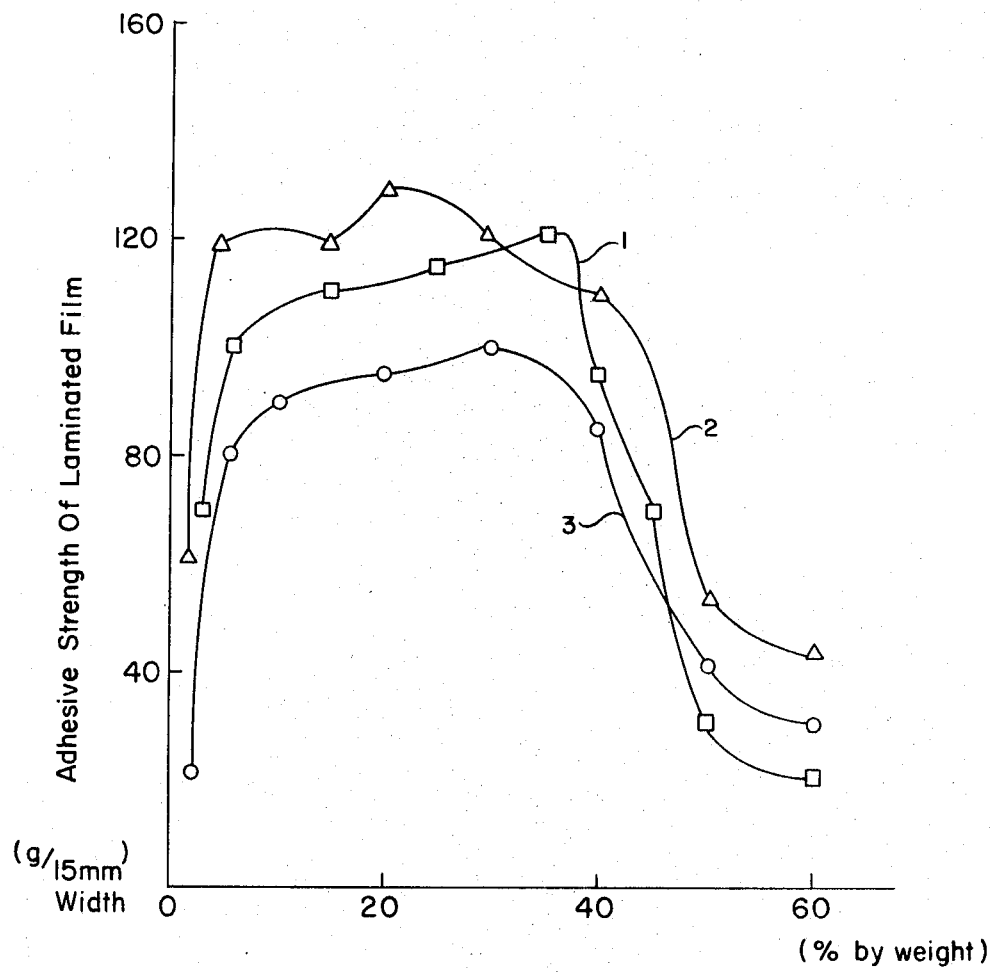
Water Content In A Polyvinyl Alcohol Film When Laminated
INVENTORS
SHOICHI ARIKAWA
KOUICHI HUJIWARA
KYOICHIRO IKARI
YUKIO NISHIMATSU
BY Stepno and Neilan
ATTORNEYS 3,625,794

METHOD OF PREPARING LAMINATED FILMS WHILE REGULATING MOISTURE CONTENT

SUMMARY OF THE INVENTION

The present invention relates to a method of preparing laminated films consisting of a polyvinyl alcohol film (hereinafter referred to as "PVA film") and a protective film, preferably a thermoplastic film, which is firmly bonded to the PVA film.

It is a primary object of the present invention to obtain low-cost, beautiful laminated films containing the above-mentioned mentioned constituent films, which laminated films have the desirable properties associated with PVA film but do not have the disadvantages thereof particularly with respect to water absorption. The laminated films of the present invention find particular utility as material for forming packages such as bags and the like.

BACKGROUND OF THE INVENTION

It is known that PVA film has excellent oxygen impermeability therethrough and, in addition, it has very desirable properties for use as a packaging film such as, e.g., good tensile properties, tear strength, blowout strength, and transparency and also the property that it may easily be formed into bags by a conventional technique using heat and/or vacuum. However, in most cases, it is difficult to use a PVA film alone as a packaging film since it absorbs water and consequently softens when brought into contact with water or placed in a highly humid atmosphere. In addition, the absorption of water lowers the film's printing, bagmaking and packaging properties and increases its oxygen permeability. Therefore, when it is required that the packaging film have excellent oxygen impermeability, e.g., for use in packaging foodstuffs or where the package contains a moisture-containing matter or the packaged matter is subjected to sterilization by hot water, it is usual to line the PVA film with a water-resistant film on at least one surface thereof to protect the PVA film from water or water vapor. In these cases, although any of the known waterproof films are useful as the protective film, it is desirable to use such a protective film that will give a laminated film in combination with the PVA film which makes up for the drawbacks of the PVA film without any sacrifice of the excellent packaging properties of the PVA film. It is possible to obtain laminated films having particularly excellent quality by laminating the PVA film with a protective film which may be a thermosetting film or a thermoplastic film having a low moisture permeability and good waterproofness, excellent transparency and an appropriate hardness. Examples of suitable protective films are stretched polypropylene film, stretched polyester film, polystyrene films, polyvinyl chloride, nylon and polycarbonate films.

PRIOR ART

In prior art laminating techniques, the PVA film was laminated with a low moisture-permeable film such as one of those mentioned above by a so-called dry lamination wherein the PVA film is united with the low moisture-permeable film by the aid of an adhesive. However, it is impossible to attain a firm bonding between the PVA film and such low moisture-permeable thermoplastic film because the PVA film is formed of a highly polar substance while the low moisture-permeable film is formed of a low polar and high crystalline substance. For this reason, the adhesives which may be conveniently used were restricted to a few kinds of adhesives and, despite their high prices, it was hard to obtain a satisfactory bonding. Also, such adhesives required use of an organic solvent with the consequent danger of fire and, in some cases, it was difficult to obtain transparent laminated films due to the solubility of the thermoplastic film in the organic solvent.

In addition, heretofore the low moisture-permeable highly water-resistant thermoplastic films, such as polyethylene film, polypropylene film and like quite nonpolar films, usually required an electric discharge treatment, oxidation treatment or like surface treatment and, furthermore, an anchor coating for enhancement of the bonding strength. Accordingly, the procedure for the manufacture of the laminated film was complicated and expensive. Thus, heretofore laminated films of a PVA film with such a low moisture-permeable film has been considered to be uneconomical for use as packaging film in spite of their excellent properties as a packaging film.

A so-called extrusion coating process is known in the art, e.g., the lamination of polyethylene with regenerated cellulose film in which the polyethylene is melt extruded and simultaneously laminated with a regenerated cellulose film. However, this process has hitherto been considered to be impractical for the manufacture of PVA film laminates because the manufacture of PVA films is carried out by extrusion of an aqueous PVA composition and, accordingly, it is necessary to dry the extrude PVA film.

BRIEF DESCRIPTION OF THE DRAWING

The drawing is a graph showing the relationship between the water content in the polyvinyl alcohol film which is being laminated and the adhesive strength of the resulting laminated film.

DETAILED DESCRIPTION OF THE INVENTION

In accordance with the present invention it has been discovered that in the manufacture of PVA film by an extrusion process in which the PVA is extruded from a slit in the form of a film and passed through a drying step for evaporation of the contained water, which procedure differs from the manufacture of polyvinyl chloride or polyethylene film by a melt extrusion process, it is possible to obtain a laminated film simultaneously with the manufacture of the PVA film by introducing a lamination step into the film-forming procedure and regulating the drying of the PVA film to maintain suitable regulation of the moisture content of the PVA film. Applicants have found that very useful laminated films of the subject construction may be obtained in the course of manufacturing a PVA film by conditioning a melt of a polyvinyl alcohol resin having a moisture content of 20 to 60 percent by weight to a temperature of 50° to 160° C., extruding the melt through a slit in the form of a thin film onto a roller having a surface temperature from room temperature to 100° C. passing the film over one or more hot rollers so that the film achieves a semidry state having a moisture content of 5 to 40 percent by weight, and pressing the semidried PVA film against the protective film which may be any of the protective films referred to above. Preferably the protective film is an untreated thermoplastic film or a thermoplastic film which has previously been coated with an aqueous binder, that is, a binder containing water as a solvent or dispersion medium.

A hydrated polyvinyl alcohol resin in the form of flakes, chips or pellets, which has been adjusted to a moisture content of 20 to 60 percent by weight and, optionally, to which has been added a plasticizer, a surface-active agent or other compounding ingredients, is supplied to and brought into a molten state in a screw-type melt extrusion machine. A moisture content of less than 20 percent by weight makes it impossible to form films in the melt extrusion process, and a moisture content above 60 percent by weight makes it difficult to smoothly extrude the melt through the lips, to stretch the extrusion between the lips and drying roller and to separate the drying film from the roller, and results in an irregularity of the resulting film and lowering of the production rate. The melt or dope is adjusted to a temperature between 50° C. and 160° C. and extruded in the form of a thin film through a slit onto the surface of a rotary drum, the surface of which has been smoothly plated or coated with a resin and adjusted to a temperature between normal room temperature and 100° C. A melt temperature of below 50° C. is undesirable because it causes increase in extrusion pressure, irregularity in extrusion through the lips, difficulty in stretching of the extrusion between the lips and drying roller and results in irregularity of the surface of the resulting and lowering of efficiency. On the other hand, a melt temperature above 160° C. will cause foaming of the melt and results in irregularity of the surface of the resulting film.

A drying roller temperature of above 100° C. is undesirable because it makes the surface of the film irregular. The PVA film having an excellent laminating property thus obtained is passed over a hot roller or rollers having a surface between room temperature and 100° C. and, when it is dried to a semidry state of a moisture content of 5 to 40 percent by weight, the film is laminated with the protective film to form a laminated film in which the two films are very firmly bonded to each other.

Since, with decrease of the moisture content of the PVA film upon lamination, the stickiness of the film gradually decreases and the structure of the films becomes tight, it is considered to be desirable for obtaining laminated films with a high adhesion between the laminations to laminate the PVA films with the protective film while it has a high moisture content. However, the bonding strength between the laminations in the resulting laminated film is not always higher when the PVA film is laminated while it has a high moisture content than when laminated after dried to a low moisture content because, if the PVA film is laminated when it has a high moisture content, the PVA film shrinks with elimination of the residual moisture by drying after lamination which causes a strain in the layer of adhesive and, thereby, the bonding strength is lowered. From the aspect of the rate of production, the drying speed of the resulting laminated films is lowered by the lamination with a protective film because after the lamination the moisture contained in the PVA film is allowed to vaporize from only a single surface of the laminated film. Therefore, it is desirable to laminate when the moisture content of the PVA film is as low as possible. Applicants have found, as a result of investigation of the relationship between the moisture content and the bonding strength or production rate of the laminated films, that it is possible to obtain laminated films exhibiting a good adhesion between the laminations by uniting under pressure a PVA film with a protective film, e.g., a thermoplastic film when the PVA film has a moisture content of 5 to 40, preferably 10 to 35 percent by weight.

The laminated films thus obtained are in most cases, especially useful where the laminated films are used for packaging hydrous matters or where the film is required to have a good heat-sealing property. In the latter case, the PVA film is laminated with, e.g., a polyethylene film. The secondary protective film may be any of the known moisture impermeable films and the lamination of the secondary protective film may be carried out in any of the known manners by virtue of the good adhesion and freedom from any internal stress or strain of the laminated films in accordance with the present invention.

The term "protective film" herein used means any thermoplastic or thermosetting film having low moisture-permeabilities, such as of polyethylene, polypropylene or like polyolefin, polyester, polystyrene, nylon, polyvinyl chloride, polycarbonate or the like. In case of such protective films that have a relatively high polarity as indicated by a high solubility parameter of 14 or more, such as nylon film, there is obtained a sufficiently firmly united laminated film without using any adhesive providing that the moisture content of the PVA film is in the range of from 5 to 40 percent. The adhesion between the laminations of the laminated films in accordance with the present invention is enhanced to a great extent by subjecting the thermoplastic film to a corona discharge treatment and, in addition, coating with an isocyanate-based anchor coating as in the case of the prior lamination processes. However, in accordance with the present invention it is possible to simplify the manufacturing process and to produce laminated films of lower price because of the concurrent preparation of the PVA film and the laminated films.

In the practice of the method of the present invention, as the adhesive there may be used any adhesive so long as it is prepared by using water as a solvent because the water remaining in the adhesive layer is eliminated after lamination through the PVA film together with the residual water in the PVA film. However, in accordance with applicants' experiences, it is preferred for obtaining a high bonding strength to use an aqueous solution of a water-soluble high molecular weight compound with a strong surface activity, such as partially hydrolyzed polyvinyl esters or an aqueous emulsion of a polyvinyl acetate or vinyl acetate-ethylene copolymer containing as a protective colloid a partially hydrolyzed polyvinyl ester. When using such adhesives, it is preferred to incorporate a cross linking agent in the binder to improve the water resistance of the adhesive.

The present invention will now be illustrated in more detail by the following examples.

EXAMPLE 1

Chips of a PVA of an average saponification degree of 99.9 mol which contains 5 percent, on the basis of PVA, of glycerol as a softener was melted and conditioned to a moisture content of 57 percent. The melt was extruded at 102° C. in the form of a film through a slit under an extrusion pressure of 18 to 20 kg./cm.² onto the surface of a roller the surface of which was adjusted to a temperature of 90° C. and the resulting film was passed over hot rollers. The PVA film of a variable moisture content thus obtained was laminated under pressure to a biaxially stretched polypropylene film to obtain a number of laminated films. The polypropylene film had been previously subjected to a corona discharge treatment and coated with "N-primer" (an anchor coating agent manufactured by Dai-Nippon Ink & Chemical Industry Co., Ltd.) and then with 5 g./m.² of "Airoo Flex 0400" (adhesive consisting of a vinyl acetate-ethylene copolymer emulsion, manufactured by Air Reduction Co., Inc. USA).

The laminated films thus obtained were subjected to friction pull tests and the results obtained were plotted in the graph as shown in the accompanying drawing, as curve 1.

In the drawing, the graph indicates the relationships between the bonding strength between the constituent films of the laminated films and the moisture content of the PVA film upon lamination. In the graph, the ordinate indicates the bonding strength in g./15 mm. width and the abscissa indicates the moisture content of the PVA film on laminating in percent by weight. The test conditions were: temperature 40° C., relative humidity 90 percent, and pull rate 30 cm./min.

It will be seen from the figure that the bonding strength is quite low when the PVA film is laminated with the biaxially stretched polypropylene film while its moisture content is more than 40 percent or less than 5 percent.

The roller which surface was adjusted to a temperature of 90° C. was 2,000 mm. in diameter, and each of the 15 hot rollers over which the resulting film was passed was also 2,000 mm. in diameter and which surfaces were adjusted to a temperature of 80° C.

EXAMPLE 2

The procedure of example 1 was repeated twice using first a polyester film and then a polystyrene film in place of the biaxially stretched polypropylene film. The results obtained were plotted as curves 2 and 3 in the figure. The curves in the figure indicates that the bonding strength is good when the PVA film is laminated under pressure while it has a moisture content of 40 percent to 5 percent.

EXAMPLES 3 to 8

Properties of laminated films manufactured in accordance with the present invention are shown in the following table in comparison with that of laminated films manufactured by prior art methods (Comparative examples 1 to 3).

| Example No. | Specimens | Bonding Strength (g./15 mm. width) |
| --- | --- | --- |
| 3 | Laminated films manufactured by preparing a PVA film containing 3% of glycerol as plasticizer and laminating the PVA film at a moisture content of 35% with a biaxially stretched polypropylene film in a similar manner as in example 1. | 110 |
| 4 | Laminated films manufactured in the same manner as in example 3 except that the polypropylene film was not subjected to corona discharge treatment. | 80 |
| 5 | Laminated films manufactured in the same manner as in example 3 except that the polypropylene film was not subjected to corona discharge treatment and not coated with any anchor coating agent. | 60 |
| 6 | Laminated films manufactured in the same manner as in example 4 except that a nylon film was used in place of the polypropylene film. | 140 |
| 7 | Laminated films manufactured in the same manner as in example 4 except that a nylon film was used in place of the polypropylene film. | 90 |
| 8 | Laminated films manufactured in the same manner as in example 5 except that a nylon film was used in place of the polypropylene film. | 90 |
| Comparative Example 1 | Laminated films manufactured by dry lamination of a polypropylene film with a PVA film of a moisture content of 4% using a polyurethane based adhesive. | 15 |
| Comparative Example 2 | Laminated films manufactured in the same manner as in comparative example 1 except that the polypropylene film was subjected to a corona discharge treatment. | 50 |
| Comparative Example 3 | Laminated films manufactured in the same manner as in comparative example 2 except that the polypropylene film was, in addition, coated with an anchor coating. | 60 |

The bonding strength is the friction pull strength at atmospheric temperature of 20° C. and a relative humidity of 65 percent.

What is claimed is:

1. A method of preparing a laminated film which comprises regulating the moisture content of a melt of a polyvinyl alcohol resin to a moisture content of 20 to 60 percent by weight, regulating the temperature of the melt to between 50° C. and 160° C., extruding the resulting melt in the form of a thin film through a slit onto the surface of a roller, maintaining the surface of the roller between room temperature and 100° C., passing the resulting film over at least one hot roller and laminating said polyvinyl alcohol film with a protective film while the polyvinyl alcohol film has a moisture content of 5 to 40 percent by weight.

2. A method according to claim 1, wherein the polyvinyl alcohol film is laminated with the protective film while it has a moisture content of 10 to 35 percent by weight.

3. A method according to claim 1, wherein the polyvinyl alcohol film is laminated with the protective film coated with an adhesive containing water.

4. A method according to claim 1, wherein said protective film is a thermoplastic film.

* * * * *